United States Patent
Burlage et al.

(10) Patent No.: US 7,392,817 B2
(45) Date of Patent: Jul. 1, 2008

(54) WATER CONSERVATION SAFETY SHUT-OFF VALVE

(75) Inventors: Roger Anthony Burlage, Westlake Village, CA (US); Brian J. Burlage, Marshalltown, IA (US)

(73) Assignee: Castlebridge Enterprises, Inc., Westlake, CA (US)

( * ) Notice: Subject to any disclaimer, the term of this patent is extended or adjusted under 35 U.S.C. 154(b) by 0 days.

(21) Appl. No.: 11/548,862

(22) Filed: Oct. 12, 2006

(65) Prior Publication Data

US 2008/0087341 A1    Apr. 17, 2008

(51) Int. Cl.
G05D 7/06 (2006.01)

(52) U.S. Cl. .................. 137/1; 137/624.11; 137/553

(58) Field of Classification Search ............ 137/624.11, 137/624.12, 487.5, 460, 553, 1
See application file for complete search history.

(56) References Cited

U.S. PATENT DOCUMENTS

| | | | |
|---|---|---|---|
| 4,352,025 A | | 9/1982 | Troyen |
| 4,708,264 A | | 11/1987 | Bruninga |
| 4,936,508 A | | 6/1990 | Ingalz |
| 5,540,107 A | | 7/1996 | Silverman et al. |
| 5,782,263 A | * | 7/1998 | Isaacson et al. .......... 137/487.5 |
| 5,971,011 A | | 10/1999 | Price |
| 5,979,493 A | * | 11/1999 | Simpkins, Jr. .......... 137/624.11 |
| 6,061,843 A | | 5/2000 | Rump et al. |
| 6,209,576 B1 | * | 4/2001 | Davis .................... 137/624.11 |
| 6,237,618 B1 | * | 5/2001 | Kushner ................. 137/624.11 |
| 6,708,722 B1 | * | 3/2004 | Goodenough ............ 137/487.5 |
| 6,837,271 B1 | * | 1/2005 | Saint ..................... 137/624.12 |
| 6,877,170 B1 | | 4/2005 | Quintana et al. |
| 6,885,114 B2 | | 4/2005 | Baarman et al. |
| 7,000,627 B1 | * | 2/2006 | Johnson ................. 137/624.11 |
| 7,075,768 B2 | | 7/2006 | Kaneko |

OTHER PUBLICATIONS

Hydroelectric Generator: Micro-hydro Basics, A Renewable Energy Project Kit, The Pembina Institute, pp. 1-9, re-energy.ca.

* cited by examiner

*Primary Examiner*—Kevin L Lee
(74) *Attorney, Agent, or Firm*—McKee, Voorhees & Sease, P.L.C.

(57) ABSTRACT

The present invention is a water conservation safety shut-off valve assembly for use on locations which normally have intermittent water usage but need to indicate when there is constant water usage, such as a leak. The valve assembly has a valve body with a fluid pathway and a valve plug held in an open position allowing water to flow through the pathway. As water flows through the pathway, a sensing device detects water flowing through the pathway and begins timing duration of water flowing through the pathway. If the water flow through the pathway stops, the timer value is reset to zero. If the water flows through the pathway, and the timer circuit reaches a predetermined manually set value, the valve closes the pathway, stopping the flow of water through the valve assembly. Preferably, the valve assembly indicates whether the valve is in an open or closed position. In addition, the valve assembly may generate its own electricity or may use standard battery or household power to operate the timer and related circuitry.

24 Claims, 5 Drawing Sheets

WATER CONSERVATION SAFETY SHUT-OFF VALVE

BACKGROUND OF THE INVENTION

The present invention relates to a water conservation safety shut-off valve.

Water usage and conservation is widely studied and many articles are written about ways for consumers and industry to conserve water. The proposed solutions generally fall into two categories: (1) behavioral and (2) engineered. Behavioral solutions are generally human responses to situations to conserve water, such as turning off the water faucet while brushing teeth. Most of the engineered solutions presented are plumbing solutions aimed at restricting consumption of water; these include items like "low-flush toilets, "toilet displacement devices," "low-flow showerheads," and "faucets aerators." Yet, the question still remains as to what is the most important thing an individual can do to reduce water usage in the home.

A simple answer is to identify and repair toilet leaks. The toilet tank is probably the most neglected plumbing fixture in a home. As valves and refill ball cocks age, they tend to leak. Flappers will deteriorate over time with exposure to water. Eventually, they begin a slow but constant seepage. Often, they silently leak away thousands of gallons of potable water before they are detected. Similarly, ball cocks will weaken with age and fail to shut-off after the tank is full, resulting in water slowly pouring over the top of the tanks overflow tube. Periodically, valves and ball cocks should be replaced as part of the routine maintenance of all plumbing in the home. A 1984 study by the U.S. Department of Housing and Urban Development reported that 20% of all toilets leak. Most leaks occur when water leaks from the tank into the bowl through flapper valves, valve seats, and overflow tubes, which often go unnoticed and unheard.

Despite attempts to conserve water, the undetected leaks account for inadvertent loss of water resources and can account for thousands of gallons of water lost in as much as 20% of all homes. All engineered solutions, sooner or later, succumb to behavioral solutions that require human intervention with inspection and repair. Thus, no engineered solutions exist to intervene when excessive water usage is detected.

Thus, in view of the foregoing, the primary feature or advantage of the present invention is to provide a water conservation safety shut-off valve which addresses one or more of the foregoing problems.

Another feature or advantage of the present invention is a water conservation safety shut-off valve which can be easily attached to existing appliances, such as toilets.

Another feature or advantage of the present invention is a water conservation safety shut-off valve which resets itself under normal use, but times out and closes under abnormal extended use.

Another feature or advantage of the present invention is a water conservation safety shut-off valve which indicates to a user when there is a problem with water usage through the valve.

Another feature or advantage of the present invention is a water conservation safety shut-off valve which is easily resettable by a user.

Another feature or advantage of the present invention is a water conservation safety shut-off valve which is economical to manufacture, durable in use, and efficient in operation.

Another feature or advantage of the present invention is a method of reducing water loss through leaky appliances using a water conservation safety shut-off valve.

One or more of these and/or other features or advantages will become apparent to one of ordinary skill in the art as described in the specification and claims that follow.

BRIEF DESCRIPTION OF THE INVENTION

One or more of the foregoing features or advantages may be accomplished by a fluid or water shut-off valve assembly and method where the valve assembly has a valve body with a fluid passageway, a valve plug movable between an open position and a closed position thereby allowing fluid to pass through the passageway when the plug is in the open position and not allowing fluid to pass through the passageway when the plug is in the closed position. The valve plug is biased toward the closed position and held open by a valve plug catch device. A fluid flow detection device for detecting the flow of fluid through the passageway communicates with a timer for timing duration of fluid through the passageway and causing the valve plug catch device to release the valve plug and thereby causing the valve plug to move from the open position to the closed position once a predetermined time limit has been reached by the timer. This plugs the fluid passageway and stops the flow of fluid through the passageway.

One or more of the foregoing features or advantages may be accomplished by a water conservation safety shut-off valve having an electrical generating system for generating electricity using energy of the water passing through the valve to turn a shaft on a small electrical generator. The valve assembly may have electronics to store the electrical energy generated.

One or more of the foregoing features or advantages may be accomplished by a water conservation safety shut-off valve having a trip indicator for indicating whether the valve plug is opened or closed.

One or more of the foregoing features or advantages of the present invention may be accomplished by a water conservation safety shut-off valve which resets the timer to a zero value when water flowing through the valve stops and thereby indicating normal use.

One or more of the foregoing features or advantages additionally may be accomplished by a method of conserving fluids or water loss through leaky appliances by providing a fluid shut-off valve, releasably holding the valve in an open position and thereby allowing fluid to flow through the valve, sensing the flow of fluid through the valve, timing duration of fluid flowing through the valve, determining whether the duration of fluid flowing through the valve has met a predetermined value, and releasing the valve plug to close once the predetermined value has been reached and thereby stopping the flow of fluid through the valve. The valve timer can reset the value of the duration of fluid flowing through the valve to zero when the fluid flowing through the valve stops, indicating there is no leak.

DETAILED DESCRIPTION OF THE PREFERRED EMBODIMENT

The present invention is a water conservation safety shut-off valve and method.

Figure 1:
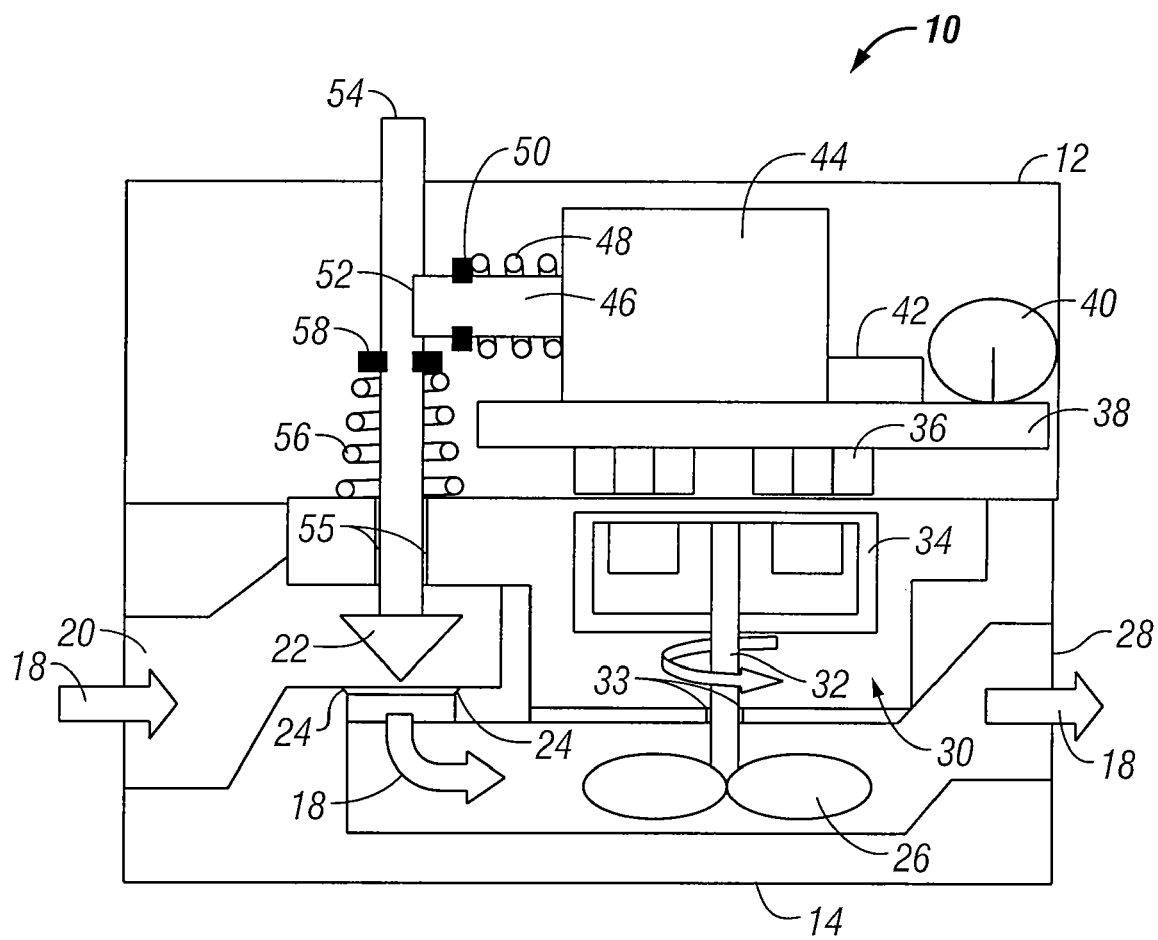
FIG. 1 is a cutaway side view of one embodiment of the water conservation safety shut-off valve of the present invention.

FIG. 1 shows a water conservation safety shut-off valve assembly 10 of the present invention. The valve assembly 10 has a cover 12 for containing and protecting parts of the valve assembly 10 used in connection with the valve body 14.

The valve body 14 can be constructed from any material capable of allowing water or other fluids to flow through the valve body 14. However, it is preferred that the valve body 14 be constructed from plastic, brass, or other substances which have low risk of rust, corrosion, etc.

There is a water flow path 18 through the valve body 14 as indicated by the arrows showing the water flow path 18. The water flow path 18 can be any shape or direction through the valve body 14 and can be any size depending on the need or volume of water which is to flow through the valve assembly 10. Water enters the valve assembly 10 at the water inlet connection 20 of the water flow path 18, flows past a valve plug 22, and through a valve seat 24, past a water flow detection device, such as an impeller or blade 26, and out the water outlet connection 28 of the water flow path 18.

The water inlet connection 20 and the water outlet connection 28 can be adapted to connect with any desirable plumbing fixture or use. For example, the inlet 20 and outlet 28 can be adapted to connect to a standard household plumbing supply line so that the valve assembly 10 can be used with toilets, faucets, ice makers, etc. Additionally, the inlet 20 and outlet 28 can be adapted to be used with other plumbing devices, such as garden hoses, so that the valve assembly 10 can be used to automatically time usage of water and close the valve assembly 10, stopping the flow of water through the flow path 18 when attached to a lawn sprinkler. In other words, the valve assembly 10 can be adapted to connect with or fit to any desirable use or appliance.

The body head assembly 30 holds the impeller shaft 32. The impeller shaft 32 is attached to the impeller or blade 26. The impeller or blade 26 can be any shape or configuration, such as an impeller, blade, squirrel cage, etc., but will be called impeller for simplicity. As water flows through the water path 18, the pressure and flow of the water rotates the impeller 26. Seals 33 surround the impeller shaft 32 keeping the water inside the water flow path 18 and allowing the impeller shaft 32 to rotate outside of the water flow path 18 and within the body head assembly 30. The direction of rotation of the impeller 26 and the impeller shaft 32 is not critical.

An onboard microgenerator system generates electricity using the power of the water flowing through the flow path 18 to turn the impeller shaft 32. As the impeller shaft 32 turns, it turns a rotor portion 34 of the generator. The rotor 34 is separate from, but in close enough proximity with a stator portion of the generator 36 to create an inductive electromagnetic force to generate electricity as easily understood by one ordinarily skilled in the art. The generator in the preferred embodiment uses permanent magnets to form the rotor portion 34 and uses electrically conductive wire coils to complete the stator portion 36 of the generator. With the rotation of the permanent magnets of differing magnetic poles, an electrical current is induced in the stator coils 36, thereby generating electricity.

The stator 36 is attached to a printed wiring assembly or printed circuit board 38. The printed circuit board 38 is located separate from the valve body 14 to avoid any contact with water or fluid flowing through the valve and is preferably located inside the cover 12 to protect from dust and electrical shock.

Electricity generated by the generating system 34, 36 is regulated by circuitry on the printed circuit board 38 and stored in an electricity storage capacitor or battery 40. Any type of energy storage device can be used for storing the electricity generated by the generating system 34, 36.

Since the water flowing through the flow path 18 may be intermittent such as the normal use of a household toilet, the generating system 34, 36 generates electricity as water flows through the flow path 18 turning the impeller 26 and the rotor 34, thereby generating electricity and storing the generated electricity in the storage capacitor or battery 40 for use in running the circuitry on the printed circuit board 38. As a result, the printed circuit board 38 has a continuous supply of energy to operate the onboard circuitry, even though the generation of electricity is intermittent.

A timing circuit 42 is incorporated onto the printed circuit board 38. The timing circuit 42 checks for rotation of the impeller 26, meaning that water or fluid is flowing through the flow path 18 by determining that the rotor 34 is rotating and generating electricity. One reason for the timing circuit is to determine the duration or length of time water or fluid has been traveling through the flow path 18. Used in this way, the time or duration calculated by the timing circuit 42 can determine if water or fluid has been traveling through the flow path 18 greater than a predetermined duration of time which would indicate abnormal operation and possibly a leak in downstream appliances. On the other hand, if the valve assembly 10 is used on a yard sprinkler or the like, a time out of the timer 42 simply indicates the desired duration of use has elapsed.

Once the timing circuit 42 determines that the duration or time of water flowing through the flow path 18 is greater than the predetermined value, the timing circuit 42 initiates a transfer of electrical energy from the storage capacitor or battery 40 to an electrical solenoid 44. The solenoid 44 is a standard solenoid having a plunger 46 which travels linearly back and forth along the solenoid 44. A solenoid plunger spring 48 is held in place around the solenoid plunger 46 between a casing for the solenoid 44 and the solenoid plunger spring keeper ring 50. The solenoid plunger spring 48 keeps biasing pressure on the solenoid plunger 46 to maintain an outer-most traveled position when the solenoid 44 is not electrically energized. Once the solenoid 44 is energized electrically, the magnetism created within the solenoid 44 pulls the solenoid plunger 46 toward the solenoid 44 body against the biasing pressure of the solenoid plunger spring 48. Then, once the electrical energy is no longer energizing the solenoid 44 coils, the solenoid plunger 46 then travels back outward with the biasing force of the solenoid plunger spring 48.

The solenoid plunger 46 engages a detent or catch 52 in the valve stem 54 of the valve plug 22. Having the solenoid plunger 46 engage the detent 52 on the valve stem 54 causes the valve stem 54 and corresponding valve plug 22 to be held into position until the solenoid 44 is energized, pulling the solenoid plunger 46 away from the valve stem 54 and out of the valve stem detent 52.

The valve stem 54 and valve plug 22 travel linearly through the valve body 14, the body head assembly 30, and cover 12. Having the valve stem 54 extend through the cover 12 allows for the valve stem 54 to indicate whether the valve plug is in an open or closed position with respect to the valve seat 24 and a flow path 18. If the valve stem 54 is lower with respect to a cover 12, the valve plug is mating with the valve seat 24 and thereby closing off the flow path 18. A user can then simply pull upward on the valve stem or trip indicator 54 until the valve plug 22 disengages the valve seat 24 and the detent 52 mates with the solenoid plunger 46 again holding the valve stem 54 and valve plug 22 in an open position allowing water or fluid to again flow through the flow path 18. In addition to the valve stem or trip indicator 54 indicating open or closed position of the valve plug 22, a signal can be generated by the electronics on the circuit board 38 to operate a light, buzzer, or other type of trip indicator (not shown).

To keep the water flowing through the flow path 18, a seal or seals 55 are located in the body head assembly 30, allowing the valve stem 54 to travel linearly, but not allowing water to leak through the seal 55. The valve stem 54 is biased towards a downward position, or towards the valve seat 24 by the valve stem spring 56 and the valve stem spring keeper ring 58. In this configuration, shown in FIG. 1, the valve stem spring 56 is a tension spring held between the body head assembly 30 and the valve stem spring keeper ring 58 and pulling downward on the valve stem 54. Therefore, in the relaxed position, the valve stem 54 is in its downward most position so that the valve plug 22 can sealably mate with the valve seat 24 to close the flow path 18.

As shown in FIG. 1, the valve stem spring 56 is a tension spring pulling downward, whereas the solenoid plunger spring 48 is a compression spring pushing outward on the solenoid plunger 46. However, any type of spring or biasing device can be used with the solenoid plunger 46 or the valve stem 54 so long as the solenoid plunger 46 can securably engage the valve stem 54 holding it in position and the valve stem can travel when released by the solenoid plunger 46 to close the flow path 18.

Figure 2:
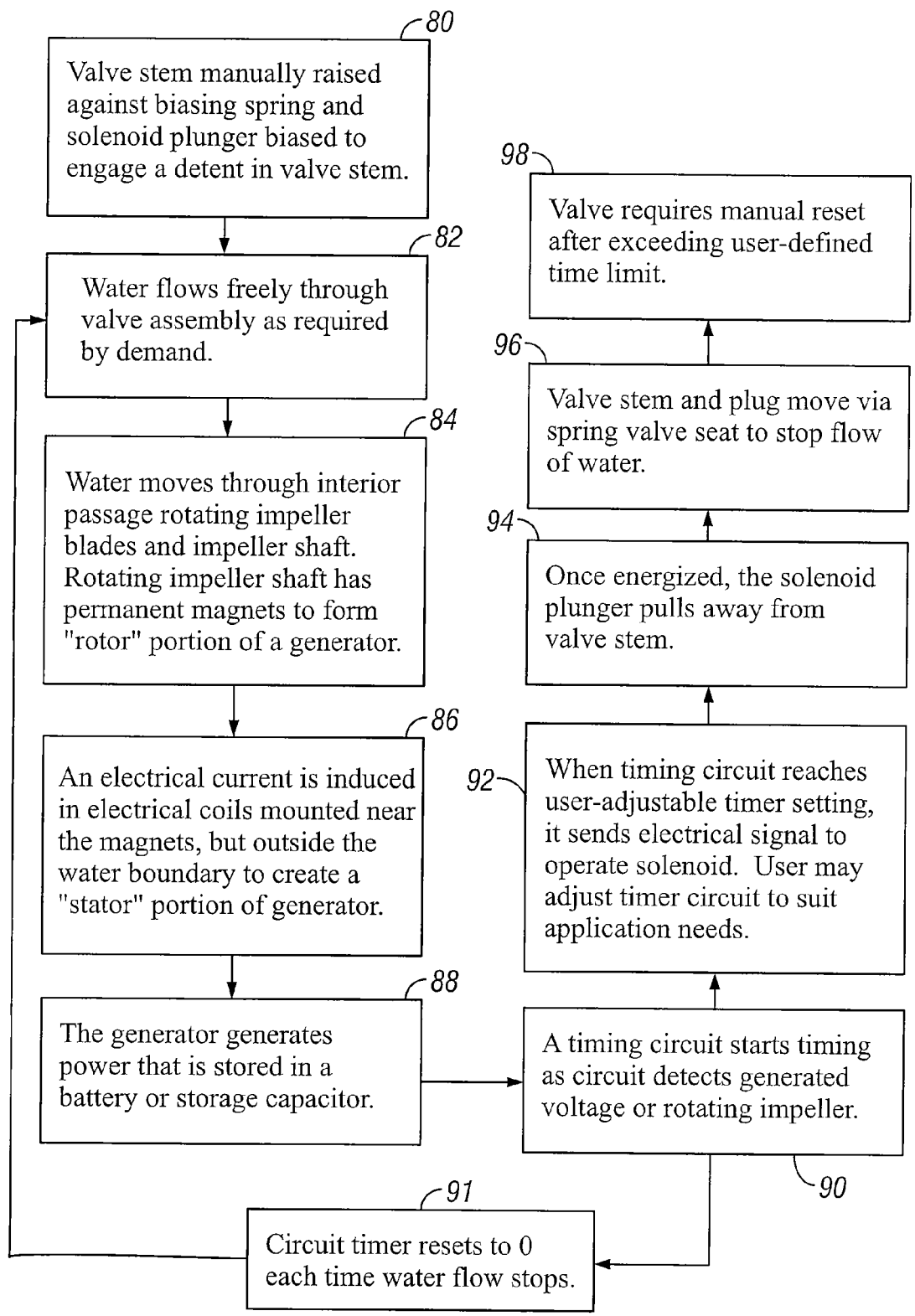
FIG. 2 is a flow chart showing steps of operation for the water safety shut-off valve of FIG. 1.

FIG. 2 shows a flow chart of the operation of the valve assembly 10 shown in FIG. 1. The valve assembly 10 is connected at the inlet 20 and outlet 28 to a standard plumbing system. As shown at 80, the valve stem 54 is manually raised against the biasing spring 56 allowing the solenoid plunger 46 to engage the detent 52 in the valve stem 54. At 82, the water or other fluid flows freely through the valve assembly 10 as is required by demand of the appliance or other device connected at the outlet 28 of the valve assembly 10. At 84, water or other fluid moves through the interior passage or pathway 18 rotating the impeller 26 and impeller shaft 32. Also, at 84, the rotating impeller shaft 32 rotates permanent magnets attached to the impeller shaft 32 to form a rotor portion of a generating system. Step 86 gives that an electrical current is induced in electrical coils 36 which are mounted near the magnets of the rotor 34, away from the water boundary from the valve assembly 10 to create a stator portion 36 of the electrical generator. As shown in 88, the generating system 34, 36 generates electricity by inducing an electrical current through the windings of the stator 36 by the changing poles of the permanent magnets of the rotor 34 and that electrical energy is stored in a battery or capacitor 40. Once the timing circuit 42 detects electricity is being generated, indicating that water or fluid is flowing through the flow path 18, the timing circuit 42 begins timing a duration that the water or fluid is flowing through the flow path 18. Each time the water flow stops, the circuit timer 42 is reset to a value of zero as shown at 91. If the water flow does not stop, 92 gives that when the timing circuit reaches a preset and user adjustable timer setting value, the timing circuit 42 initiates sending of an electrical signal to operate the solenoid 44. The valve assembly 10 is preferably set up so that a user may adjust the timer circuit 42 to suit the application in which the valve assembly 10 is used. Once the solenoid 44 is energized, the solenoid plunger 46 pulls away from the valve stem 54 and out of the detent 52 as given in 94. Step 96 gives that the valve stem 54 and attached valve plug 22 move once the solenoid plunger disengages the detent 54 using the biasing force supplied by the valve stem spring 56 to seat the valve plug 22 firmly against the valve seat 24 to stop the flow of water or fluid through the flow path 18 of the valve assembly 10. The final step, step 98, shown in FIG. 2, requires that the valve assembly 10 can be manually reset by pulling upward on the valve stem or trip indicator 54 after the timing circuit 42 reaches a value exceeding a preset user defined time limit.

It is understood, however, that many different steps or combination of steps adding or deleting from those shown in FIG. 2 can be used to control and operate the valve assembly 10.

Tests on a prototype of the valve assembly 10 shown in FIG. 1 indicate that there is a proportional relationship between volumetric flow rate and electricity generated, making a user adjustable time or predetermined duration possible through the valve assembly 10. In addition, the valve assembly 10 can be configured so that the valve plug 22 will trip or close after a predetermined volume of fluid has passed through the flow path 18. Since the generated electricity is proportional to the flow rate, the electronics on the pc board 38 and the timing circuit 42 can calculate volume of liquid through the valve assembly 10 and close the flow path 18 after the predetermined volume has passed through the valve assembly 10. For example, the valve assembly 10 can be set to close after 500 gallons of water or fluid has passed through the valve assembly 10. The desired volume set point is adjustable for different volumes.

Figure 3:
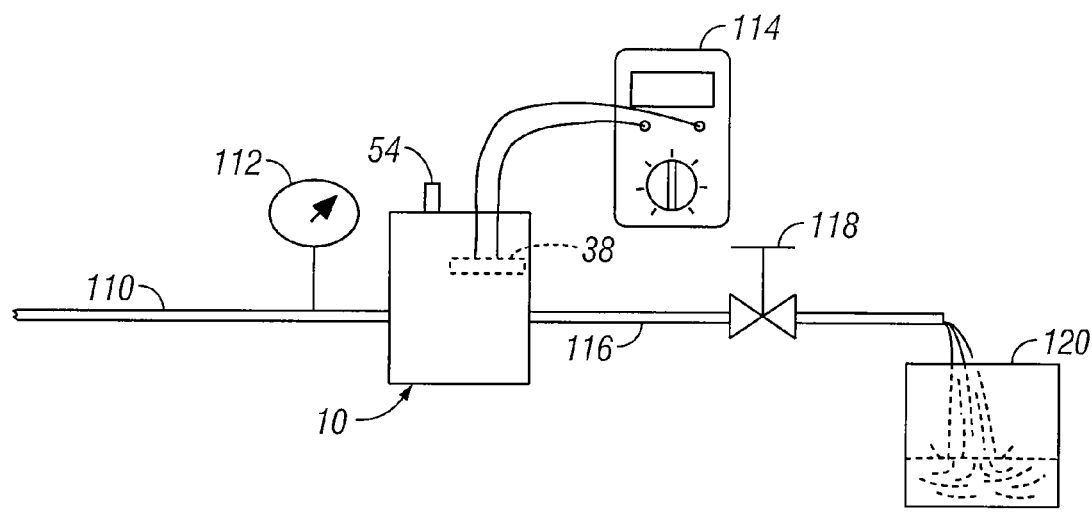
FIG. 3 shows a test setup for testing operation of the water conservation safety shut-off valve of FIG. 1.

The testing setup is shown in FIG. 3 for testing the valve assembly 10. The water pressure in a city water line 110 is tested using a fluid pressure gauge 112 at the inlet 20 of the valve assembly 10. A multimeter 114 was connected to the generated electrical outputs on the printed circuit board 38 for measuring generated voltage AC. An exit water line 116 was connected to the water outlet connection 28 of the valve assembly 10. A flow control valve 118 was used to regulate the flow of water through the valve assembly 10, downstream of the valve assembly 10. The water flowing through the test setup was then drained into a 1-gallon measuring container 20 for measuring and containment. The data collected for pressure at the fluid pressure gauge 112, the millivolt AC voltage at the printed circuit board 38, the time for filling the 1-gallon measuring container 20, and the calculated gallons per minute flow rate are given in Table 1.

TABLE 1

| | | Time to Collect 1 Gallon of Water Flow Rate | |
|---|---|---|---|
| P1 psig | mVac | Sec | Gal/min |
| 43 | 60 | 100 | 0.60 |
| 40 | 83 | 78 | 0.77 |
| 37 | 100 | 65 | 0.92 |
| 33 | 122 | 57 | 1.05 |
| 27 | 150 | 43 | 1.40 |
| 20 | 180 | 38 | 1.67 |
| 14 | 200 | 33 | 1.82 |
| 11 | 208 | 31 | 1.94 |

Figure 4:
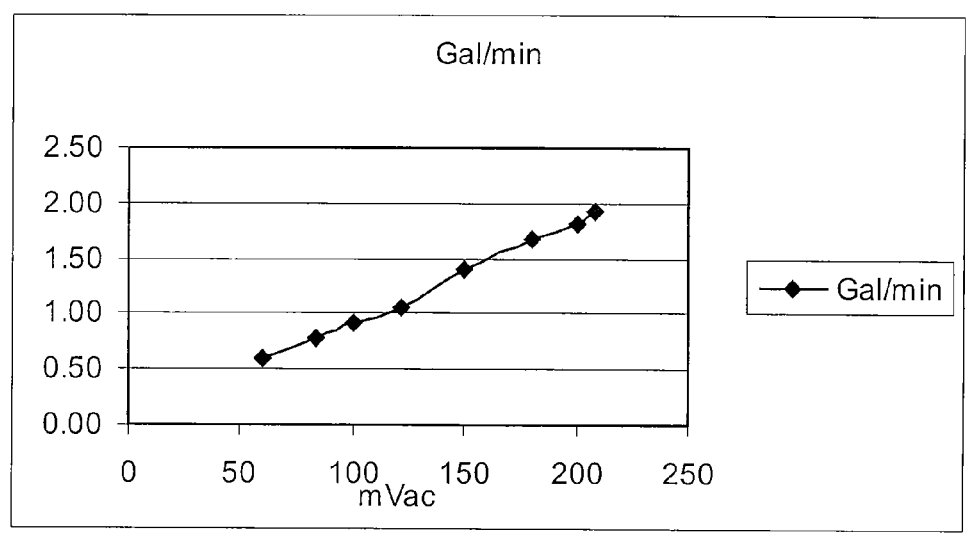
FIG. 4 shows a chart of volumetric flow rate through the water conservation safety shut-off valve of FIG. 1 versus voltage of electricity generated by the generator.

FIG. 4 then shows a chart of the data collected as shown in Table 1. The data in table 1 is not limiting on design of the present invention, but only one example to prove a proportional relationship between flow rate and generated electricity. Thus, the design capabilities of the present invention can be scaled according to design criteria and need for specific use applications.

The results shown in Table 1 and FIG. 4 indicate that the valve assembly 10 can be used to generate self-sustaining electricity using the water flow through the valve assembly 10 to generate power to operate the controls for the valve assembly 10. In addition, since flow rate is proportional with the generated electricity, adjustments in flow rate can be used to vary generated voltage output of the generating system 34, 36 and to adjust predetermined time-out values.

Figure 5:
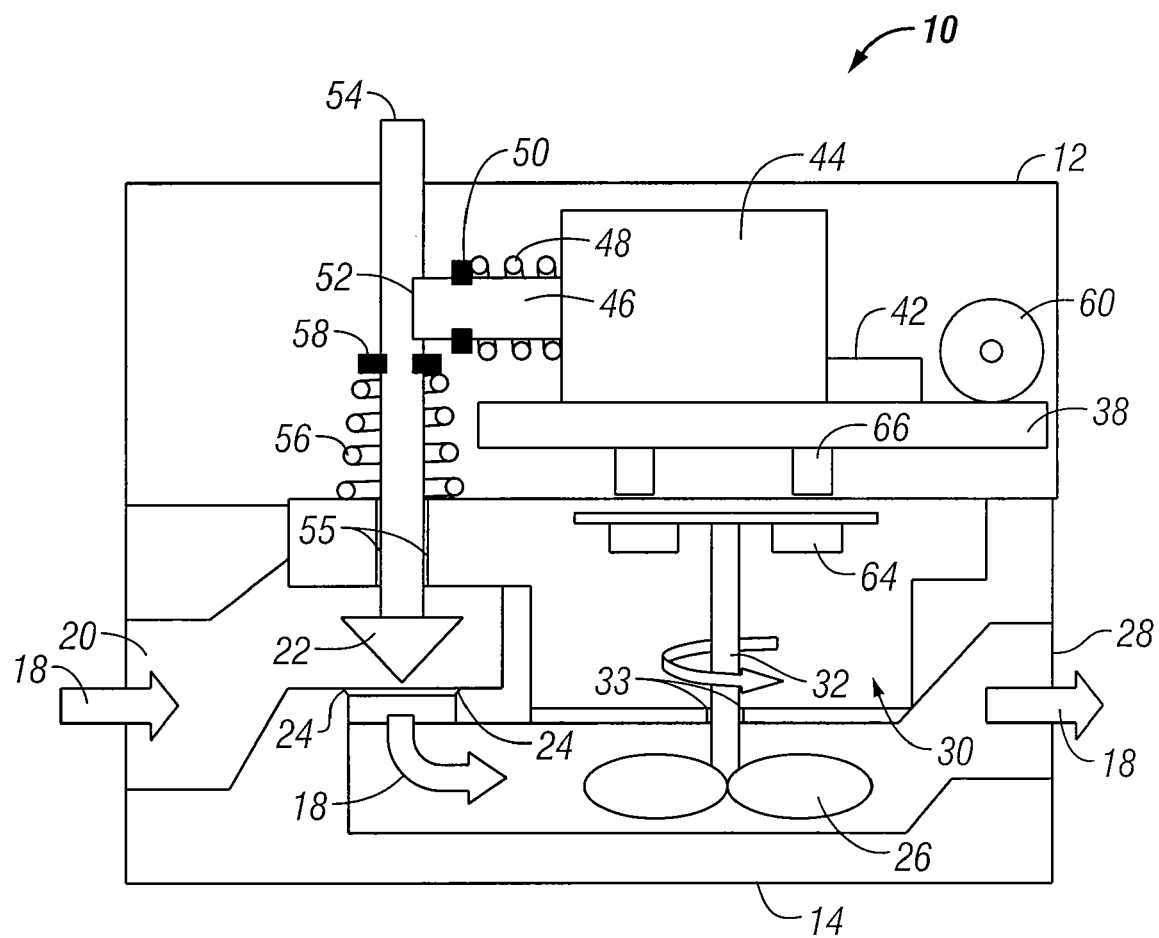
FIG. 5 shows a cutaway side view of another embodiment of a water conservation safety shut-off valve.
Figure 6:
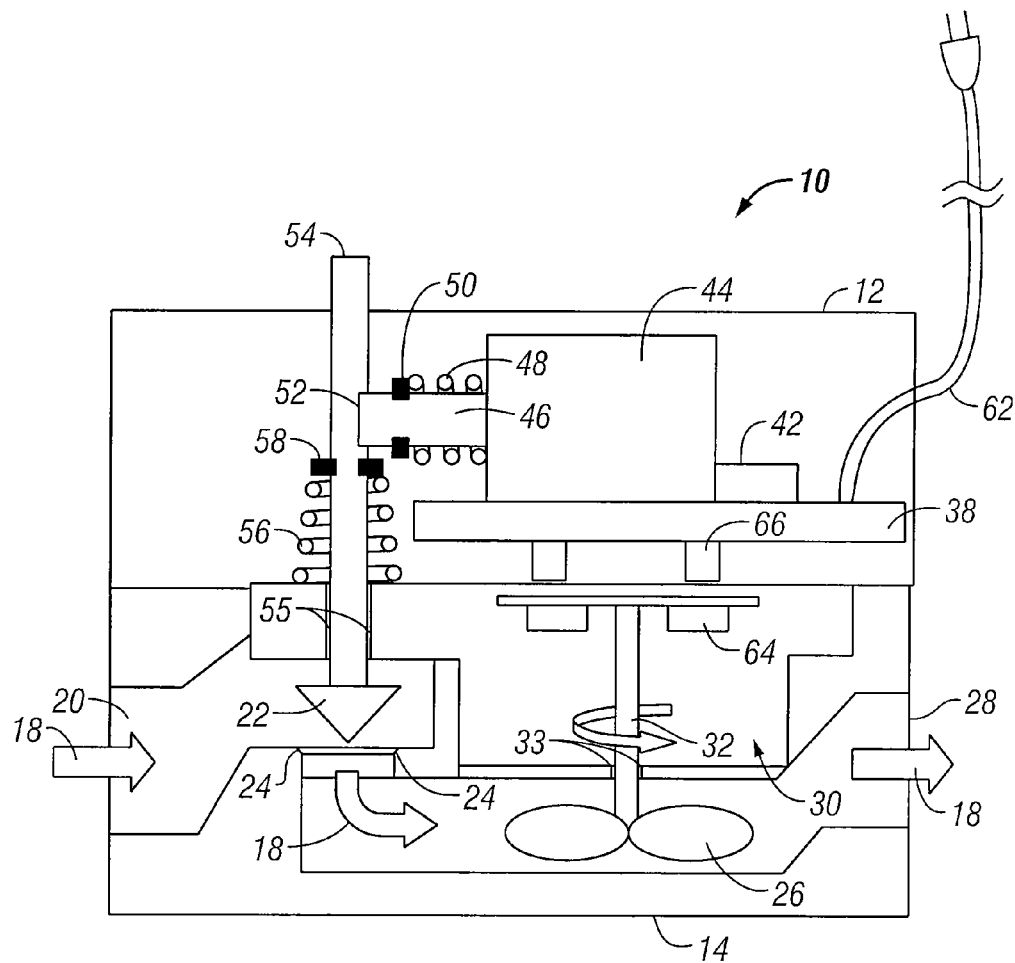
FIG. 6 shows a cutaway side view of still another embodiment of a water conservation safety shut-off valve.

Other embodiments of a water conservation safety shut-off valve assembly 10 are shown in FIGS. 5 and 6. These embodiments work essentially the same as described above for FIG. 1. However, FIG. 5 has a standard battery electrically connected to the printer circuit board 38 for powering the electronics on the printed circuit board 38. Also, on this embodiment, the detection of water flowing through the flow path 18 is conducted using motion sensors 64, 66 attached to the impeller shaft 32 and the printed circuit board 38, respectively. These sensors 64, 66 can be magnetic sensors, optical sensors, or any other type of motion sensing sensor. In other words, the flow through the flow path 18 is detected in the embodiment shown in FIGS. 5 and 6 using motion sensors 64, 66 and not using electricity generated through a rotor 34 and stator 36.

Another embodiment of the water conservation safety shut-off valve assembly 10 is shown in FIG. 6 having an electrical power cord 62 attached to the printed circuit board 38 for powering the electronics on board the printed circuit board 38 and operating the valve assembly 10. The valve assembly 10 shown in FIG. 6 operates similarly to the valve assembly 10 shown in FIGS. 1 and 5 above. In addition, the detection of water flowing through the flow path 18 in the embodiment shown in FIG. 6 is similar to that shown in FIG. 5 and described above.

In conclusion, the water conservation safety shut-off valve assembly 10 of the present invention is manually set to an open position and allows water or other fluids to run through the valve assembly 10 under normal use. When a preset time value or duration has timed out with water or fluid flowing through the valve continually, the valve closes indicating that there is a problem with the downstream usage of the water supply or that the desired time has simply elapsed. The valve assembly can generate its own electricity to run the electronics and the timer circuit or can have the electronics powered by a battery 60 or through standard household power via a power cord 62.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:
1. A fluid shut-off valve assembly comprising:
a valve body having a fluid passageway;
a valve stem having a valve plug moveable between a first position and a second position allowing fluid to pass through the passageway when the plug is in the first position, and not allowing fluid to pass through the passageway when the plug is in the second position, the valve plug biased toward the second position;
a valve plug catch device having a solenoid plunger adapted to engage a detent in the valve stem to hold the valve plug in the first position;
a fluid flow detection device for detecting flow of fluid through the passageway; and
an electronic timer electrically connected to the fluid flow detection device for timing duration of fluid flowing through the passageway and causing the solenoid plunger to disengage the detent to release the valve plug, causing the valve plug to move from the first position to the second position once a predetermined time limit has been reached by the timer and thereby plugging the fluid passageway and stopping the flow of fluid through the passageway.

2. The fluid shut-off valve assembly of claim 1 further comprising an electrical generating system that generates electricity by rotating a rotor of a generator with the power of the fluid passing through the fluid passageway.

3. The fluid shut-off valve assembly of claim 2 further comprising an electrical storage device for storing the generated electricity.

4. The fluid shut-off valve assembly of claim 2 wherein the valve plug catch device has an electrical solenoid which is actuated to move the solenoid plunger to disengage the detent to release the valve plug using the generated electricity.

5. The fluid shut-off valve assembly of claim 1 wherein the valve plug catch device is an electrical solenoid which is actuated to release the valve plug using energy stored in a battery or by household power.

6. The fluid shut-off valve assembly of claim 1 further comprising a cover adapted to house the valve, wherein the valve stem extends outside the cover to indicate whether the valve plug is in the first position or the second position.

7. The fluid shut-off valve assembly of claim 6 wherein the valve is manually reset by pulling upward on the stem, whereby the solenoid plunger re-engages the detent in the valve stem to hold in the first position.

8. The fluid shut-off valve assembly of claim 1 further comprises a user adjustable electronic timer adapted to reset the duration of fluid flowing through the passageway to zero time when the fluid stops flowing through the passageway.

9. A water shut-off valve assembly comprising:
a valve body having a water passageway;
a valve stem attached to a valve plug moveable between a first position and a second position allowing water to pass through the passageway when the plug is in the first position, and not allowing water to pass through the passageway when the plug is in the second position, the valve plug biased toward the second position;
a solenoid plunger adapted to engage a detent in the valve stem to hold the valve plug in the first position;
a water flow detection device for detecting flow of water through the passageway; and
an electronic timer operatively connected to the water flow detection device, the electronic timer having a user adjustable time setting to time duration of water flowing through the water passageway and causing the valve plug to move from the first position to the second position when the user adjustable time setting has been reached by the electronic timer and thereby stopping the flow of water.

10. The water shut-off valve assembly of claim 9 further comprising an electrical generating system having a rotor within the water passageway, the rotor attached to a generator and turned by water passing through the water passageway to generate electricity to operate the valve.

11. The water shut-off valve assembly of claim 10 further comprising an electrical storage device for storing the generated electricity.

12. The water shut-off valve assembly of claim 10 further comprising an electrical solenoid operatively connected to the solenoid plunger that is actuated to release the valve plug using the generated electricity, thereby allowing the valve plug to move to the second position as biased.

13. The water shut-off valve assembly of claim 9 further comprising a cover adapted to house the valve, wherein the valve stem moves commensurate with movement of the valve plug relative to the cover as a trip indicator of the position of the valve plug.

14. The water shut-off valve assembly of claim 13 wherein the position of the trip indicator indicates whether the valve plug is in the first position or the second position.

15. The water shut-off valve assembly of claim 14 wherein the trip indicator is manually reset by lifting up on the valve stem to move from the first to the second position to open the valve to water flow.

16. The water shut-off valve assembly of claim 9 wherein the electronic timer resets to the user adjustable time setting when the water stops flowing through the water passageway.

17. A method of conserving fluids comprising the steps of: providing a shut-off valve, the valve including a valve body having a fluid flow path, a valve plug for opening and closing the flow path, a sensor for sensing flow of fluid through the flow path, and a timer for timing duration of fluid flowing through the flow path, the valve plug biased toward a closed position;
   engaging a detent in a valve stem attached to the valve plug with a solenoid plunger to keep the valve plug in an open position thereby allowing the fluid to flow through the fluid flow path;
   sensing the flow of the fluid through the flow path;
   timing duration of the fluid flowing through the flow path;
   determining whether the duration of the fluid flowing through the valve has met a user adjustable time setting; and
   disengaging the solenoid plunger from the detent in the valve stem to the valve plug to close the flow path once the user adjustable time setting has been reached, thereby stopping the flow of fluid through the valve.

18. The method of conserving fluids of claim 17 further comprising the step of resetting the timer to the user adjustable time setting when fluid flowing through the flow path stops.

19. The method of conserving fluids of claim 17 further comprising the step of turning a rotor within the flow path with the fluid flowing through the valve to generate electricity to operate the valve.

20. The method of conserving fluids of claim 19 further comprising the step of using the generated electricity to accomplish the step of releasing the valve plug.

21. The method of conserving fluids of claim 17 adjusting the adjustable time setting of the timer commensurate with the desired fluid flow to a fixture.

22. The method of conserving fluids of claim 17 further comprising the step of lifting the valve stem to manually set the valve plug in the open position.

23. The method of conserving fluids of claim 17 further comprising the step of indicating to the user whether the valve plug is in the open or closed position by moving the valve stem commensurate with movement of the valve plug relative to a cover surrounding the valve.

24. A fluid shut-off valve assembly comprising:
   a cover adapted to house a valve body having a fluid passageway;
   a valve stem terminating in a valve plug adapted to close off the fluid passageway, the valve stem extending through the cover to indicate whether the valve is open or closed;
   a solenoid plunger adapted to engage a detent in the valve stem to keep the valve plug from obstructing the fluid passageway;
   a fluid flow detection device adapted to detect a fluid flow event;
   an electronic timer electrically connected to the fluid flow detection device and having a user adjustable time setting that when elapsed during the water flow event causes the solenoid plunger to disengage the detent to close the fluid passageway; and
   an electrical generating system adapted to optionally power the valve during stand-alone operation.

\* \* \* \* \*